(12) United States Patent
Kim

(10) Patent No.: US 7,994,904 B2
(45) Date of Patent: Aug. 9, 2011

(54) SYSTEM FOR AUTOMATICALLY RECOGNIZING LOCATIONS OF RESPECTIVE TIRES

(75) Inventor: You Keun Kim, Anyang-Si (KR)

(73) Assignee: Hyundai Motor Company, Seoul (KR)

( * ) Notice: Subject to any disclaimer, the term of this patent is extended or adjusted under 35 U.S.C. 154(b) by 186 days.

(21) Appl. No.: 12/286,567

(22) Filed: Oct. 1, 2008

(65) Prior Publication Data
US 2009/0289783 A1 Nov. 26, 2009

(30) Foreign Application Priority Data
May 20, 2008 (KR) .................. 10-2008-0046752

(51) Int. Cl.
*B60C 23/00* (2006.01)

(52) U.S. Cl. ........ 340/442; 340/443; 340/445; 340/447; 340/539.13; 340/10.1; 340/438; 340/439; 73/146.2; 73/146.5

(58) Field of Classification Search .......... 340/442–447, 340/539.13, 10.1, 825.49, 438; 73/142.5, 73/146.2, 146.5
See application file for complete search history.

(56) References Cited

U.S. PATENT DOCUMENTS

| | | | |
|---|---|---|---|
| 6,700,480 B2 * | 3/2004 | Moore | 340/445 |
| 6,838,985 B2 * | 1/2005 | Ghabra et al. | 340/445 |
| 6,879,252 B2 * | 4/2005 | DeZorzi et al. | 340/505 |
| 6,914,523 B2 * | 7/2005 | Munch et al. | 340/447 |
| 7,015,801 B1 * | 3/2006 | Juzswik | 340/442 |
| 7,716,976 B2 * | 5/2010 | Lin | 73/146.4 |

FOREIGN PATENT DOCUMENTS
KR 2007-0060303 6/2007

* cited by examiner

*Primary Examiner* — Tai T Nguyen
(74) *Attorney, Agent, or Firm* — Edwards Angell Palmer & Dodge LLP; Peter F. Corless

(57) ABSTRACT

A system for automatically recognizing the locations of respective tires includes tire sensors, startup antennas, and a control unit. Locations of the respective tire sensors can be recognized based information of which antenna is involved and whether signals transmitted are identical. With this system, the locations of respective tires of a vehicle can be recognized in a simpler and more efficient way.

17 Claims, 3 Drawing Sheets

PRIOR ART

SYSTEM FOR AUTOMATICALLY RECOGNIZING LOCATIONS OF RESPECTIVE TIRES

CROSS-REFERENCE TO RELATED APPLICATIONS

This application claims under 35 U.S.C. §119(a) priority to Korean Application No. 10-2008-0046752, filed on May 20, 2008, the disclosure of which is incorporated herein by reference in its entirety.

BACKGROUND

1. Technical Field

The present invention relates to a system for automatically recognizing all the locations of the respective tires of a vehicle.

2. Background Art

If the pneumatic pressure of the tire of a vehicle is too high or too low, unfavorable results may entail. For example, the tire may burst or the vehicle may easily slide, which may cause a terrible accident. Also, the vehicle may consume more fuel, which may cause a decrease in fuel efficiency. Further, the lifespan of the tire may be reduced. In addition, the sense of comfort and braking power may decrease. In particular, if the tire pneumatic pressure is low, a hydroplane phenomenon and a standing wave phenomenon may occur. If the tire temperature is excessively high, a heat separation phenomenon may occur.

As described above, tires are important elements required to perform safe operation of a vehicle, and thus a Tire Pressure Monitoring System (TPMS), also called an automatic tire pneumatic pressure recognition system or a tire pressure recognition system, has been recently mounted on a vehicle, thereby allowing the defects of tires to be detected in advance.

The TPMS is designed such that the pressure and temperature of tires are recognized using Radio Frequency Identification (RFID) sensors attached on the respective tires, and information related thereto is sent to a display that can be viewed from a drivers' seat, so that a driver can check the pressure and temperature of the tires in real time. When this system is used, the durability of, the sense of comfort from, and the braking power of tires can be improved, fuel efficiency can be improved, and a phenomenon in which the body of a vehicle violently shakes can be prevented.

The TPMS first recognizes the locations of the respective tires of a vehicle, and then determines whether each of the tires is stable by checking the turning force, pneumatic pressure, and temperature of the corresponding tire using a sensor attached thereon. Therefore, in order to operate the TPMS, the automatic recognition of the locations of respective tires should first take place. In the prior art, Low Frequency Initiators (LFIs) are used for the automatic recognition of the locations of respective tires.

With reference to FIG. 1, a prior art automatic tire recognition system using a TPMS will be described. TPMS sensors are installed on the respective tire wheels of a vehicle, and LFIs are installed to be close to the respective tires. A TPMS receiver is installed inside the vehicle.

With regard to a process of operating the prior art automatic tire recognition system using a TPMS, a TPMS receiver 20 sends a TPMS operation signal to LFIS 30. Each of the LFIs 30 sends a startup signal in an LF region to a corresponding TPMS sensor 52. The TPMS sensor 52 which received the LF startup signal is woken up, and then sends an Identification (ID), which is unique to the corresponding TPMS sensor 52, to the TPMS receiver 20. The TPMS receiver 20 recognizes the locations of the respective tires 50 using the IDs received from the respective TPMS sensors 52, and displays the locations of the respective tires 50 on a cluster 10 that can be viewed from a driver's seat. When abnormalities occur on a tire 50 at a specific location, the TPMS receiver 20 notifies a driver of the location of the tire on which the abnormalities have occurred, thereby enabling the driver to actively manage the abnormalities.

However, such a prior art system for automatically recognizing the locations of respective tires using a TPMS has problems in that LFIs are installed on the respective tires, so that costs increase, and in that a large amount of costs for maintenance are required when failures occur on the LFIS.

Meanwhile, recently, a smart key system or a passive entry system is mounted in a vehicle together with the TPMS, which has been described above. The smart key system is configured such that, when a passenger carries an identification key (a key fob) and approaches a vehicle, the LF antennas mounted on the vehicle send respective LF signals to the identification key, so that a user is authenticated in conjunction with the identification key which is in communication with a smart key Electronic Control unit (ECU), and then doors and a trunk are opened. Recently, a smart key system is used to control the opening and closing of the doors of a vehicle and prevent robbery.

Both the smart key system and the TPMS use wireless communication. When both systems are mounted on a vehicle, various wireless communication components should be mounted, so that there are problems in that costs increase and communication errors occur.

The above information disclosed in this Background section is only for enhancement of understanding of the background of the invention and therefore it may contain information that does not form the prior art that is already known in this country to a person of ordinary skill in the art.

SUMMARY OF DISCLOSURE

Accordingly, the present invention has been made keeping in mind the above problems occurring in the prior art, and an object of the present invention is to provide a system for automatically recognizing the locations of respective tires of a vehicle in a simpler and more efficient way.

In one aspect, the present invention provides a system for automatically recognizing the locations of respective tires, including: tire sensors installed in, on, or near respective tires of a vehicle; startup antennas installed at or near one of front and rear sides of the vehicle and both right and left sides of the vehicle, each of the startup antennas being configured to send, in response to operation signals, startup signals to a pair of the tire sensors that are closer to each of the respective antennas; and a control unit configured to send the operation signals to the respective startup antennas, receive Identification (ID) signals from the respective tire sensors, and recognize locations of the respective tire sensors based information of which antenna the ID signals come from and whether the ID signals received are identical.

In an embodiment, the startup antennas each may be installed in, on or near a right door, a left door, and a trunk of the vehicle.

In this embodiment, the control unit recognizes as a rear left tire sensor a tire sensor corresponding to one of the ID signals received from the left door antenna, which is identical to one of the ID signals received from the trunk antenna, and recognizes as a front left tire sensor a tire sensor corresponding to the remaining one of the ID signals received from the left door antenna. Also, the control unit recognizes as a rear right tire sensor a tire sensor corresponding to one of the ID signals received from the right door antenna, which is identical to one of the ID signals received from the trunk antenna, and recognizes as a front right tire sensor a tire sensor corresponding to the remaining one of the ID signals received from the right door antenna.

In another embodiment, the startup antennas each may be installed in, on or near a right door, a left door, and a hood of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other aspects and features of the invention will be discussed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
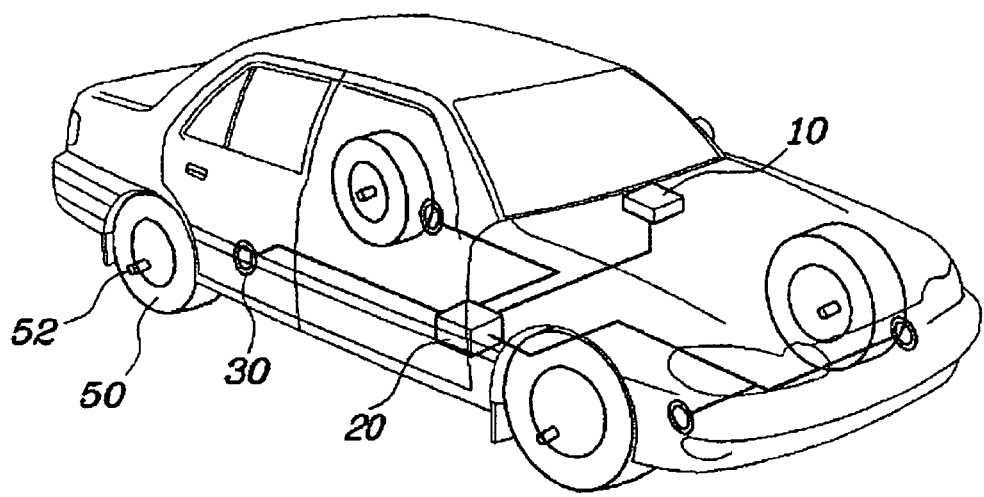
FIG. 1 is a view showing the configuration of a prior art system for automatically recognizing the locations of respective tires.

Systems for automatically recognizing the locations of respective tires according to preferred embodiments of the present invention will be described in detail with reference to the attached drawings, in which the same reference numerals are used throughout the different drawings to designate the same or similar components.

Figure 2:
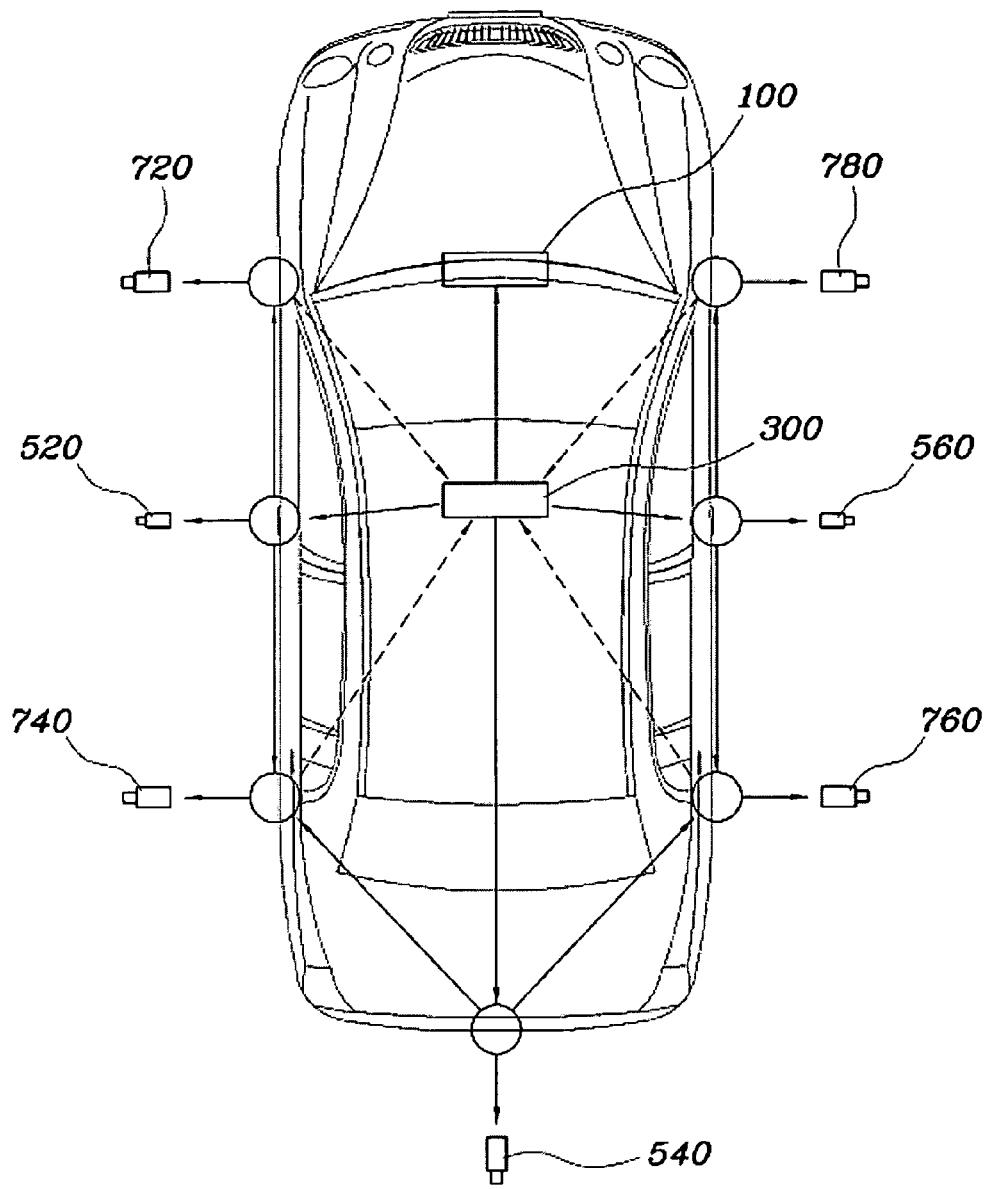
FIG. 2 is a view showing the configuration of a system for automatically recognizing the locations of respective tires according to an embodiment of the present invention.

With reference to FIG. 2, a system for automatically recognizing the locations of respective tires of a vehicle according to an embodiment of the present invention includes tire sensors, startup antennas and a control unit.

The tire sensors are installed in, on or near the respective tires. They are configured to be able to be woken up in response to startup signals received from the startup sensors and transmit their unique ID signals;

The startup antennas are installed at or near one of the front and rear sides of the vehicle and both the right and left sides of the vehicle. In response to operation signals received from the control unit, each of the startup antennas sends startup signals to a pair of the tire sensors that are closer to each of the respective antennas.

The control unit is configured to send the operation signals to the respective startup antennas, receive ID signals from the respective tire sensors, and recognize the locations of the respective tire sensors based on the information of whether identical ID signals are received.

In an embodiment, the tire sensors may send their respective unique ID signals and information about the acceleration and temperature of each of the tires, using RF signals. Preferably, the tire sensors are attached to the wheels of the respective tires. According to their locations, the tire sensors can be designated as a Front Right (FR) tire sensor 780, a Front Left (FL) tire sensor 720, a Rear Right (RR) tire sensor 760, and a Rear Left (RL) tire sensor 740. The respective tire sensors have their respective unique IDs. For example, they each may have unique IDs, 1 (FL), 2 (FR), 3 (RR), and 4 (RL). The IDs are divided and then transmitted using various means, such as phase difference, in the form of RF signals.

In an embodiment, the startup antennas may be installed on one of the front and rear sides of the vehicle and both the right and left sides of the vehicle.

In another embodiment, the LF antennas of a smart key system may be used. In this case, preferably, the LF antennas 520, 560, 540 of the smart key system, which are respectively installed on a left door, a right door, and a trunk of the vehicle, may be used. In this regard, a hood antenna located in the front side of the vehicle may be used instead of the trunk antenna 540.

Hereunder, a system including such LF antennas of a smart key system will be described below, for further illustration of the present invention.

When the LF antennas are approached by the identification key of a smart key system, they transmit respective LF signals to the identification key, and, simultaneously, send LF startup signals to the respective tire sensors 720, 740, 760, and 780 so as to recognize the locations of the respective tires.

When the vehicle enters an ignition-on state, the control unit 300 suitably sends respective operation signals to the three startup antennas 520, 540, and 560. The ignition-on state corresponds to first and second ignition states not including start state. The control unit 300 can simultaneously or sequentially send the respective operation signals to the startup antennas 520, 540, and 560.

The startup antennas, having received the respective operation signals, send respective LF signals as startup signals to respective pairs of tire sensors. Each of the startup antennas sends startup signals to the tire sensors that are closer to each of the respective antennas. That is, the left door antenna 520 sends respective startup signals to the FL tire sensor 720 and the RL tire sensor 740, the trunk antenna 540 sends respective startup signals to the RL tire sensor 740 and the RR tire sensor 760, and the right door antenna 560 sends respective startup signals to the FR tire sensor 780 and the RR 760 tire sensor.

The tire sensors 720, 740, 760, and 780, having received the respective startup signals, send their respective unique ID signals (e.g., 1, 2, 3, and 4) to the control unit 300 in the form of RF signals.

The control unit 300 recognizes the locations of the respective tires by using the received ID signals.

Preferably, the control unit 300 may be configured to include a single ECU for recognizing the locations of the respective tires and then displaying the locations of the respective tires on the cluster inside the vehicle.

Also preferably, the control unit 300 may be configured to include both a smart key system ECU 300 for recognizing the locations of the respective tires and a TPMS receiver 100 for receiving the recognized locations of the respective tires and displaying the locations of the respective tires on the cluster inside the vehicle.

Further preferably, the control unit 300 may be configured such that the smart key system ECU 300 sends an operation signal, and the TPMS receiver 100 receives ID signals from the respective tire sensors, recognizes the locations of the respective tires, and then displays the locations of the respective tires on the cluster inside the vehicle.

Suitably, it is also possible to add only a logic for recognizing the locations of respective tires to the existing smart key system ECU 300, and to display the locations of the respective tires on the vehicle using the TPMS receiver 100. In this case, the smart key system ECU 300 performs both a function of authenticating a user in conjunction with the user's ID key and a function of recognizing the locations of respective tires.

Figure 3:
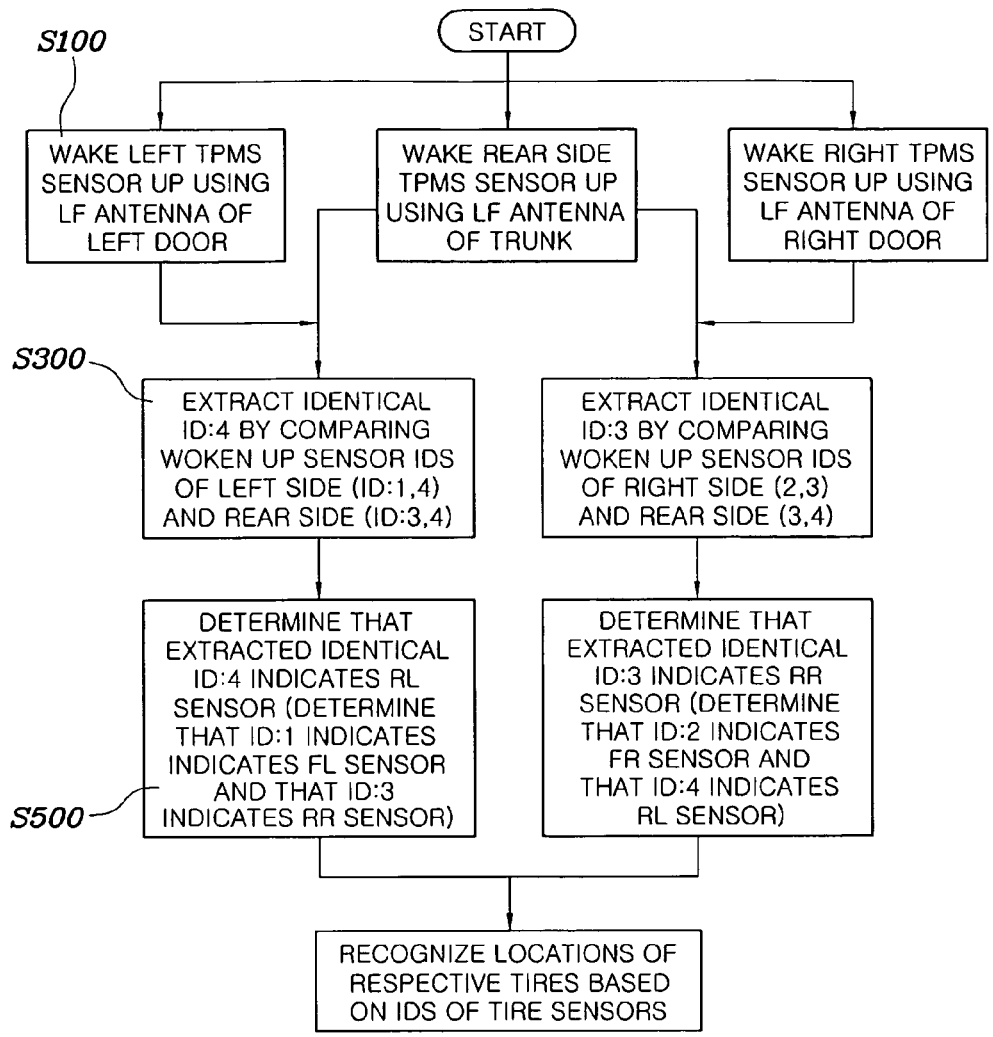
FIG. 3 is a flowchart showing the operation sequence of the system of FIG. 2.

An example of the methods of recognizing the locations of respective tires according to the present invention will be described in detail with reference to the flowchart of FIG. 3.

In response to startup signals transmitted from respective startup antennas which received respective operation signals, the tire sensors are woken up from a sleeping mode at step S100.

In more detail, the FL and RL tire sensors, woken up by the left door antenna, send their ID signals (1,4), respectively. The RL and RR tire sensors, woken up by the trunk antenna, send their ID signals (4,3), respectively. The ID signals transmitted from the left door antenna and those from the trunk antenna are compared. As the ID signal (4) is repeatedly received, it is recognized as the RL tire sensor. As the ID signal (1) transmitted from the left door antenna is not repeatedly received, it is recognized as the FL tire sensor. (S500)

In the same manner, the right door antenna wakes up the FR and RR tire sensors, receives ID signals (2,3), and compares the received ID signals (2,3) with the ID signals (4,3) received from the trunk antenna. The ID signal (3), which has been repeatedly received, is recognized as the RR tire sensor, and the ID signal (2), which has not been repeatedly received, is recognized as the FR tire sensor at step S500.

After all the processes are completed, the relationship between the ID signals and the locations of the respective tires is established as 1:FL, 2:FR, 3:RR, and 4:RL.

The recognized locations of the respective tires are sent from the control unit 300 to the TPMS receiver 100, and then displayed on the cluster inside a vehicle. The location of a specific tire on which abnormalities occur is displayed on the cluster when the abnormalities occur on the specific tire during travel. In an embodiment, the TPMS receiver 100 can recognize the locations of respective tires by directly receiving the ID signals of the tire sensors without using the smart key control unit 300.

According to the exemplified method of recognizing the locations of respective tires, the control unit of a smart key system sends respective operation signals to startup antennas, and each of the startup antennas sends startup signals to respective tire sensors that are close to the corresponding startup antenna. The tire sensors are woken up and then send respective ID signals to the control unit, and the control unit recognizes the tire sensors, that is, the control unit recognizes the tire sensor corresponding to an ID signal, which has been repeatedly received, as an RL tire sensor or an RR tire sensor, and recognizes the tire sensor corresponding to a remaining ID signal as an FL tire sensor or an FR tire sensor in consideration of the location of each of the startup antennas.

According to the systems for automatically recognizing the locations of respective tires having the configuration according to the present invention, the locations of respective tires can be automatically recognized using the LF antennas and the smart key control unit of a smart key system instead of LFIs used in a prior art TPMS, so that costs can be decreased and communication errors can be prevented.

Further, since the locations of all four tires can be recognized using only three LF antennas, the system is simpler and more efficient.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for automatically recognizing locations of respective tires of a vehicle, comprising:
   tire sensors installed in, on, or near respective tires of a vehicle;
   startup antennas installed at or near one of front and rear sides of the vehicle and both right and left sides of the vehicle, each of the startup antennas being configured to send, in response to operation signals, startup signals to a pair of the tire sensors that are closer to each of the respective antennas; and
   a control unit configured to send the operation signals to the respective startup antennas, receive Identification (ID) signals from the respective tire sensors, and recognize locations of the respective tire sensors based information of which antenna the ID signals come from and whether the ID signals received are identical,
   wherein the startup antennas each are installed in, on or near a right door to provide a right door antenna, a left door to provide left door antenna, and a trunk to provide a trunk antenna of the vehicle, and
   the control unit recognizes as a rear left tire sensor a tire sensor corresponding to one of the ID signals received from the left door antenna, which is identical to one of the ID signals received from the trunk antenna.

2. The system as set forth in claim 1, wherein the startup antennas are Low Frequency (LF) antennas each for sending an LF signal to an ID key of a smart key system.

3. The system as set forth in claim 1, wherein the control unit comprises:
   a smart key system Electronic Control Unit (ECU) for authenticating a user in conjunction with an ID key of the smart key system, and recognizing the locations of the respective tires; and
   a Tire Pressure Monitoring System (TPMS) receiver for receiving information about the locations of the respective tires from the smart key system ECU and sending the information about the locations of the respective tires to a display unit.

4. The system as set forth in claim 1, wherein the control unit sends the operation signals in an ignition-on state of the vehicle.

5. The system as set forth in claim 1, wherein the control unit recognizes as a front left tire sensor a tire sensor corresponding to the remaining one of the ID signals received from the left door antenna;
   and recognizes as a rear right tire sensor a tire sensor corresponding to one of the ID signals received from the right door antenna, which is identical to one of the ID signals received from the trunk antenna, and recognizes as a front right tire sensor a tire sensor corresponding to a remaining one of the ID signals received. from the right door antenna.

6. The system as set forth in claim 1, wherein the startup antennas are Low Frequency (LF) antennas each for sending. an LF signal to an ID key of a smart key system.

7. The system as set forth in claim 1, wherein the control unit comprises:

a smart key system Electronic Control Unit (ECU) for authenticating a user in conjunction with an ID key of the smart key system, and recognizing the locations of the respective tires; and a Tire Pressure Monitoring System (TPMS) receiver for receiving information about the locations of the respective tires from the smart key system ECU and sending the information about the locations of the respective tires to a display unit.

8. The system as set forth in claim 1, wherein the control unit sends the operation signals in an ignition-on state of the vehicle.

9. The system as set forth in claim 1, wherein:

the startup antennas each are installed in, on or near a right door to provide a right door antenna, a left door to provide a left door antenna, and a hood to provide a hood antenna of the vehicle.

10. The system as set forth in claim 9, wherein the control unit: recognizes as a front left tire sensor a tire sensor corresponding to one of the ID signals received from the left door antenna, which is identical to one of the ID signals received from the hood antenna, and recognizes as a rear left tire sensor a tire sensor corresponding to the remaining one of the ID signals received from the left door antenna;

and recognizes as a front right tire sensor a tire sensor corresponding to one of the ID signals received from the right door antenna, which is identical to one of the ID signals received from the hood antenna, and recognizes as a rear right tire sensor a tire sensor corresponding to a remaining one of the ID signals received from the right door antenna.

11. The system as set forth in claim 9, wherein the startup antennas are Low Frequency (LF) antennas each for sending an LF signal to an ID key of a smart key system.

12. The system as set forth in claim 9, wherein the control unit comprises:

a smart key system Electronic Control Unit (ECU) for authenticating a user in conjunction with an ID key of the smart key system, and recognizing the locations of the respective tires; and a Tire Pressure Monitoring System (TPMS) receiver for receiving information about the locations of the respective tires from the smart key system ECU and sending the information about the locations of the respective tires to a display unit.

13. The system as set forth in claim 9, wherein the control unit sends the operation signals in an ignition-on state of the vehicle.

14. A system for automatically recognizing locations of respective tires of a vehicle, comprising:

tire sensors installed in, on, or near respective tires of a vehicle;

startup antennas installed at or near one of front and rear sides of the vehicle and both right and left sides of the vehicle, each of the startup antennas being configured to send, in response to operation signals, startup signals to a pair of the tire sensors that are closer to each of the respective antennas; and a control unit configured to send the operation signals to the respective startup antennas, receive Identification (ID) signals from the respective tire sensors, and recognize locations of the respective tire sensors based information of which antenna the ID signals come from and whether the ID signals received are identical wherein the startup antennas each are installed in, on or near a right door, a left door, and a hood of the vehicle, and the control unit: recognizes as a front left tire sensor a tire sensor corresponding to one of the ID signals received from the left door antenna, which is identical to one of the ID signals received from the hood antenna.

15. The system as set forth in claim 14, wherein the startup antennas are Low Frequency (LF) antennas each for sending an LF signal to an ID key of a smart key system.

16. The system as set forth in claim 14, wherein the control unit comprises:

a smart key system Electronic Control Unit (ECU) for authenticating a user in conjunction with an ID key of the smart key system, and recognizing the locations of the respective tires; and a Tire Pressure Monitoring System (TPMS) receiver for receiving information about the locations of the respective tires from the smart key system ECU and sending the information about the locations of the respective tires to a display unit.

17. The system as set forth in claim 14, wherein the control unit sends the operation signals in an ignition-on state of the vehicle.

* * * * *